(12) United States Patent
Hwang

(10) Patent No.: US 11,468,424 B2
(45) Date of Patent: Oct. 11, 2022

(54) MOBILE CARD PAYMENT SYSTEM FOR PERFORMING CARD PAYMENT BETWEEN MOBILE COMMUNICATION TERMINALS AND METHOD THEREFOR

(71) Applicant: HANKOOKNFC, INC., Seoul (KR)

(72) Inventor: Seung Ig Hwang, Seongnam-si (KR)

(73) Assignee: HANKOOKNFC, INC., Seoul (KR)

( * ) Notice: Subject to any disclaimer, the term of this patent is extended or adjusted under 35 U.S.C. 154(b) by 403 days.

(21) Appl. No.: 15/806,518

(22) Filed: Nov. 8, 2017

(65) Prior Publication Data

US 2018/0068295 A1 Mar. 8, 2018

Related U.S. Application Data

(63) Continuation of application No. PCT/KR2016/011604, filed on Oct. 17, 2016.

(30) Foreign Application Priority Data

| | | |
|---|---|---|
| Oct. 15, 2015 | (KR) | 10-2015-0143823 |
| Oct. 23, 2015 | (KR) | 10-2015-0148165 |
| Dec. 8, 2015 | (KR) | 10-2015-0174094 |

(51) Int. Cl.
*G06Q 40/00* (2012.01)
*G06Q 20/32* (2012.01)
(Continued)

(52) U.S. Cl.
CPC ........... *G06Q 20/322* (2013.01); *G06Q 20/20* (2013.01); *G06Q 20/3227* (2013.01);
(Continued)

(58) Field of Classification Search
CPC .. G06Q 20/322; G06Q 20/20; G06Q 20/3227; G06Q 20/3278; G06Q 20/34;
(Continued)

(56) References Cited

U.S. PATENT DOCUMENTS

| | | | | |
|---|---|---|---|---|
| 8,639,602 B2* | 1/2014 | Rao | .................. | G07F 7/1025 705/35 |
| 2003/0083945 A1* | 5/2003 | Jimmy Ng | ............. | G06Q 20/04 705/21 |

(Continued)

FOREIGN PATENT DOCUMENTS

| | | | | |
|---|---|---|---|---|
| CN | 103443814 A | 12/2013 | | |
| EP | 2610799 A1 * | 7/2013 | ............. | G06Q 20/32 |

(Continued)

OTHER PUBLICATIONS

Tan et al: "NFC mobile credit card: The next frontier of mobile payment?", Telematics and Informatics 31, (2014) 292-307 (Year: 2014).*

(Continued)

*Primary Examiner* — Edward J Baird
(74) *Attorney, Agent, or Firm* — Studebaker & Brackett PC

(57) ABSTRACT

The present disclosure relates to a mobile card payment system and method, and more particularly, to a mobile card payment system and method for performing a card payment between mobile communication terminals on the basis of a phone-to-phone payment concept wherein the mobile card payment system is capable of performing a card payment by storing at least one of actual card information and virtual card information regarding normal financial cards including an actual financial card, which has a plastic solid body, and a digital financial card, in which actual card information is stored in a digital type and used, in a card-terminal-specific mobile communication terminal, setting a payment-terminal-specific mobile communication terminal as a card payment terminal, and reading the card information stored in the card-terminal-specific mobile communication terminal.

4 Claims, 9 Drawing Sheets

(51) Int. Cl.
*G06Q 20/40* (2012.01)
*G06Q 20/34* (2012.01)
*G06Q 20/20* (2012.01)
*G06Q 20/38* (2012.01)

(52) U.S. Cl.
CPC ......... *G06Q 20/3278* (2013.01); *G06Q 20/34* (2013.01); *G06Q 20/351* (2013.01); *G06Q 20/3567* (2013.01); *G06Q 20/385* (2013.01); *G06Q 20/40* (2013.01); *G06Q 20/40145* (2013.01)

(58) Field of Classification Search
CPC ............. G06Q 20/351; G06Q 20/3567; G06Q 20/385; G06Q 20/40; G06Q 20/40145
USPC .................................................. 705/35–40, 44
See application file for complete search history.

(56) References Cited

U.S. PATENT DOCUMENTS

| | | | |
|---|---|---|---|
| 2007/0022058 A1 | 1/2007 | Labrou et al. | |
| 2010/0076833 A1* | 3/2010 | Nelsen | G07F 7/10 705/14.25 |
| 2010/0088188 A1* | 4/2010 | Kumar | G06Q 20/351 705/17 |
| 2012/0028609 A1 | 2/2012 | Hruska | |
| 2012/0150669 A1 | 6/2012 | Langley et al. | |
| 2012/0290376 A1 | 11/2012 | Dryer et al. | |
| 2012/0323787 A1* | 12/2012 | Nelsen | G06Q 20/351 705/44 |
| 2013/0103560 A1* | 4/2013 | Stone | G06Q 20/3255 705/35 |
| 2013/0304651 A1* | 11/2013 | Smith | G06Q 20/3229 705/67 |
| 2014/0046786 A1 | 2/2014 | Mazaheri et al. | |
| 2014/0229381 A1* | 8/2014 | Lee | G06Q 20/40 705/44 |
| 2014/0282068 A1* | 9/2014 | Levkovitz | G06Q 20/223 715/748 |
| 2015/0227478 A1* | 8/2015 | Sadhvani | G06F 21/10 710/13 |
| 2015/0310436 A1* | 10/2015 | Lakshmanan | G06Q 20/40 705/44 |
| 2016/0104155 A1* | 4/2016 | McGaugh | G06Q 20/405 705/65 |
| 2016/0203463 A1* | 7/2016 | Bae | G06Q 20/322 705/65 |
| 2016/0364715 A1* | 12/2016 | Cho | G06Q 20/325 |

FOREIGN PATENT DOCUMENTS

| | | |
|---|---|---|
| JP | 2005-198205 A | 7/2005 |
| KR | 10-2012-0105296 A | 9/2012 |
| KR | 10-2013-0140288 A | 12/2013 |
| KR | 10-2014-0046828 A | 4/2014 |
| KR | 10-2014-0117078 A | 10/2014 |
| WO | 2012/154189 A1 | 11/2012 |

OTHER PUBLICATIONS

The extended European search report issued by the European Patent Office dated Mar. 20, 2019, which corresponds to European Patent Application No. 16855800.5-1217 and is related to U.S. Appl. No. 15/806,518.

International Search Report issued in PCT/KR2016/011604; dated Jan. 20, 2017.

An Office Action mailed by China National Intellectual Property Administration dated Sep. 28, 2021 which corresponds to Chinese Patent Application No. 20168002696.X and is related to U.S. Appl. No. 15/806,518 with English language translation.

\* cited by examiner

MOBILE CARD PAYMENT SYSTEM FOR PERFORMING CARD PAYMENT BETWEEN MOBILE COMMUNICATION TERMINALS AND METHOD THEREFOR

CROSS-REFERENCE TO RELATED APPLICATIONS

The present application is a continuation of International Patent Application No. PCT/KR2016/011604, filed Oct. 17, 2016, which is based upon and claims the benefit of priority to Korean Patent Application Nos. 10-2015-0143823, filed on Oct. 15, 2015, 10-2015-0148165, filed on Oct. 23, 2015 and 10-2015-0174094, filed on Dec. 8, 2015. The disclosure of the above-listed applications is hereby incorporated by reference herein in its entirety.

TECHNICAL FIELD

The present disclosure relates to a mobile card payment system and method, and more particularly, to a mobile card payment system and method for performing a card payment between mobile communication terminals on the basis of a phone-to-phone payment concept in which a card payment may be performed by storing at least one of actual card information and virtual card information regarding normal financial cards including an actual financial card, which has a plastic solid body, and a digital financial card, in which actual card information is stored in a digital type and used, in a mobile communication terminal of a user (a purchaser) (hereinafter referred to as a card-terminal-specific mobile communication terminal), setting a mobile communication terminal of a member store (a seller) (hereinafter referred to as a payment-terminal-specific mobile communication terminal) as a card payment terminal, and reading the card information stored in the card-terminal-specific mobile communication terminal.

RELATED ART

Generally, when products such as goods, content, and services are purchased, cash payment and credit card payment are mainly used to pay for the products. A financial card used as a payment method includes a cash card, a stock card, a check card, an insurance card, a debit card, a transportation card, a credit card, and so on, each of which may be of a prepaid type or a postpaid type.

People carry at least one financial card and pay with their financial cards after purchasing products such as a product, a service, etc.

Financial cards may be classified into magnetic-type financial cards, IC-chip-type financial cards, and so on depending on the technology.

Depending on the type of financial card, there are a magnetic secure transmission (MST) method in which information is read from a magnetic strip of a magnetic-type financial card, a near field communication (NFC) method in which card information is read from an IC-chip-type financial card, and so on. Recently, a barcode recognition method, a QR code recognition method, and an OCR capturing and recognition method, etc. have been developed and applied.

Generally, when off-line payment is made at a member store and a financial card is read by a dedicated card payment terminal such as a magnetic strip reader (MSR), a point of sales (POS) terminal, and a wired/wireless card payment terminal at the member store, the dedicated card payment terminal transmits card information read from the financial card to a corresponding card company through a van added network (VAN) company to request the card company to approve the payment and outputs a receipt when the payment is approved, thereby the payment being complete.

Also, along with the wide use of mobile communication terminals such as a smartphone and the growth of e-commerce, a non-face-to-face financial card payment method has been required in which a user and a member store cannot directly face each other. Thus, recently, actual card information regarding an actual financial card, as well as a digital financial card, is stored in a mobile communication terminal such as a smartphone, a smartpad, etc. and used to perform a payment in the form of a mobile financial card.

Also, in order to solve problems about exposure and leakage of card information that may occur when actual card information regarding an actual financial card, as well as a digital financial card, is stored, a technique for registering a virtual financial card having virtual card information instead of actual card information and performing a payment in the form of a mobile financial card has been developed and utilized. Furthermore, recently, a method of performing a payment using disposable one-time virtual card information or a one-time card number (OTC) such as a one-time password (OTP) in order to prevent even exposure and leakage of virtual card information of a virtual financial card has been developed and applied to a card payment system.

Also, recently, user authentication technology is applied to mobile communication terminals in order to increase security of the mobile communication terminals. As such user authentication technology, biometric authentication technology of using biometric information such as fingerprints and irises of users, PIN authentication technology of registering personal identification numbers (PINs) such as passwords and patterns that are set by users and performing an authentication, or the like has been additionally utilized.

As described above, a user may use not only an actual financial card, but also a mobile communication terminal having a mobile financial card stored therein like an actual financial card.

Accordingly, MST-type, NFC-type, barcode-type, QR code-type, and OCR-type dedicated card payment terminals that are installed in a member store of a seller, in addition to the conventional payment terminals, are configured to read actual and virtual card information of a mobile financial card from a mobile communication terminal and perform a payment.

Typically, the dedicated card payment terminals may be used only when a VAN company that produces and supplies hardware and software establishes a public switched telephone network (PSTN) or a wireless communication network, which is used as a VAN communication network, and approves a member store to use the network and also should receive a support of the VAN company in case of failure, breakage, or communication failure.

In order to solve such a problem, a member store has multiple dedicated card payment terminals and connects the dedicated card payment terminals to multiple VAN communication networks.

Also, in order to prevent erroneous situations such as failure, breakage, or communication failure as described above, a member store should have multiple dedicated card payment terminals and join multiple VAN communication networks, and thus has a problem in that it takes a lot of money to establish the card payment terminals.

DETAILED DESCRIPTION

Figure 1:
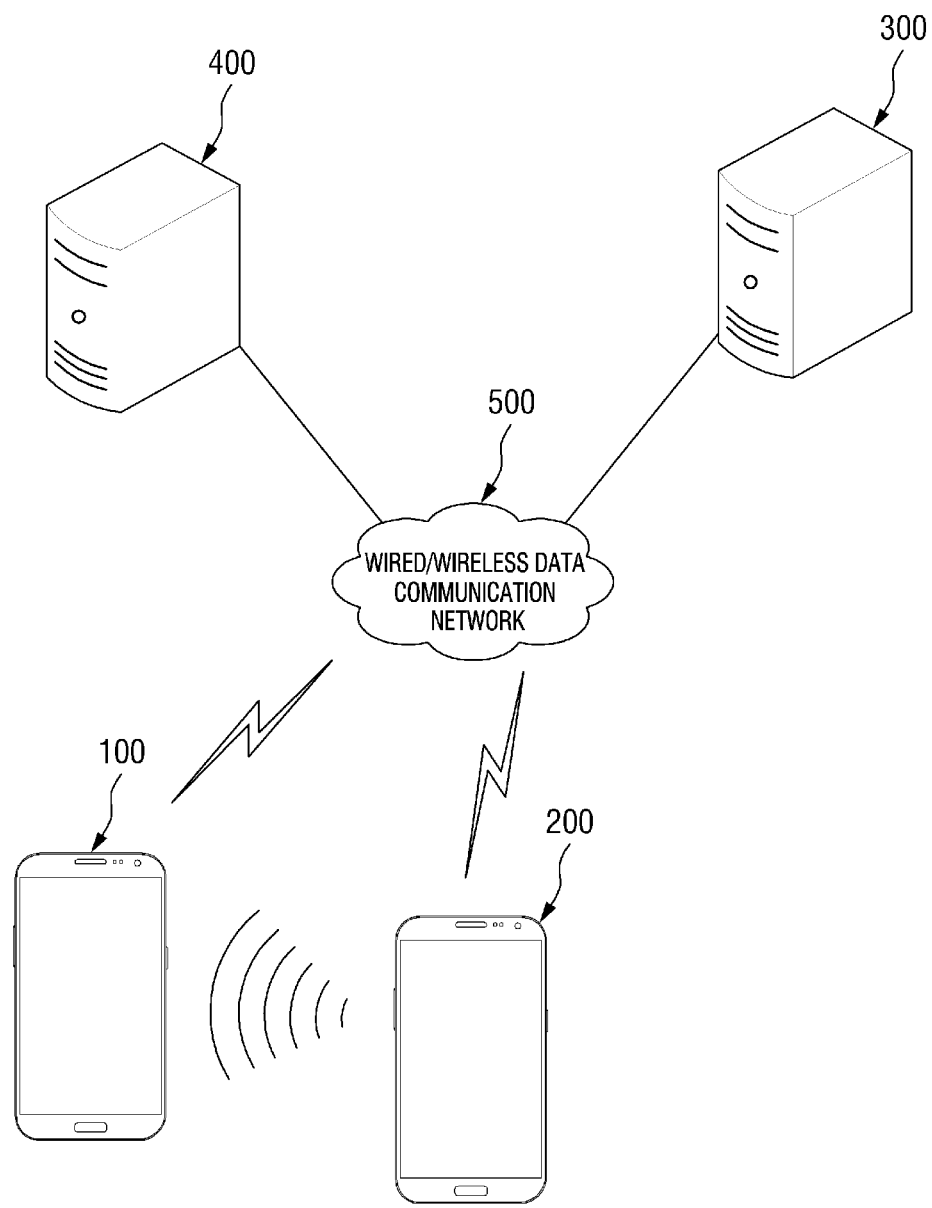
FIG. 1 is a view showing a configuration of a mobile card payment system for performing a card payment between mobile communication terminals according to the present disclosure.

The present disclosure is directed to providing a mobile card payment system and method for performing a card payment between mobile communication terminals on the basis of a phone-to-phone payment concept. The mobile card payment system is capable of performing a card payment by storing at least one of actual card information and virtual card information regarding an actual financial card and a digital financial card in a card-terminal-specific mobile communication terminal, setting a payment-terminal-specific mobile communication terminal of a member shop as a card payment terminal, and reading the card information stored in the card-terminal-specific mobile communication terminal.

In order to achieve the above objectives, a mobile card payment system for performing a card payment between mobile communication terminals on the basis of a phone-to-phone payment concept according to the present disclosure includes a card company system configured to register a card payment terminal corresponding to a received payment terminal registration log, generate and transmit virtual card information when a virtual card information request is generated, approve a payment with an actual financial card corresponding to the virtual card information when a direct payment approval request is generated based on the transmitted virtual card information, and notify of a result of the direct payment approval; a card-terminal-specific mobile communication terminal configured to request virtual financial card information from the card company system, which is a card company system of a virtual financial card selected by a user, receive virtual card information, and provide virtual card terminal information including the received virtual card information and card terminal identification information when a card information reading request is made; a payment-terminal-specific mobile communication terminal configured to read the virtual card terminal information from the card-terminal-specific mobile communication terminal when the card-terminal-specific mobile communication terminal is brought into proximity or contact after the payment-terminal-specific mobile communication terminal is registered in the card company system as a card payment terminal, transmit payment processing request information additionally including payment terminal identification information, receive the result of the direct payment approval from the card company system in response to the transmission, generate a transaction slip, and provide the transaction slip to the card-terminal-specific mobile communication terminal; and a provisional-approval terminal management server configured to acquire and store payment terminal registration information of the payment-terminal-specific mobile communication terminal, provide payment terminal registration log information of the payment-terminal-specific mobile communication terminal to the card company system, register the payment-terminal-specific mobile communication terminal as a card payment terminal, receive the payment processing request information from the registered payment-terminal-specific mobile communication terminal, and transmit direct payment approval request information to the card company system.

The card company system additionally receives an actual card information request signal including the virtual card information after the virtual card information is transmitted, and provides actual card information corresponding to the virtual card information included in the actual card information request signal to the payment-terminal-specific mobile communication terminal; the payment-terminal-specific mobile communication terminal transmits a payment processing request signal, which is a signal for requesting the actual card information, to the provisional-approval terminal management server when the virtual card terminal information is read, receives the actual card information in response to the transmission, generates a transaction statement, and transmits direct payment approval request information including the generated transaction statement to the card company system; and the provisional-approval terminal management server transmits an actual card information request signal including the card terminal identification information to the card company system when the payment processing request signal is received from the payment-terminal-specific mobile communication terminal.

The card-terminal-specific mobile communication terminal additionally stores normal financial card marker information for a normal financial card including at least one actual financial card and at least one digital financial card and provides virtual card terminal information including actual card information to the payment-terminal-specific mobile communication terminal when any normal financial card is selected on the basis of the normal financial card marker information and a card information reading request is made; and the payment-terminal-specific mobile communication terminal transmits payment request information (the transaction statement) including the virtual card terminal information to the card company system to request a payment approval.

The payment-terminal-specific mobile communication terminal transmits actual card information request information to the provisional-approval terminal management server when the virtual card terminal information is input; the provisional-approval terminal management server checks validity of payment terminal identification information and an app ID included in the actual card information request information when the actual card information request information is received, and generates and transmits a payment terminal authentication value to the payment-terminal-specific mobile communication terminal when a result of the validity check is that the payment terminal identification information and the app ID are valid; and the payment-terminal-specific mobile communication terminal requests a payment approval from the card company system when a payment terminal authentication value indicating an approval of the payment-terminal-specific mobile communication terminal to be used as the payment terminal is received.

The payment-terminal-specific mobile communication terminal generates and provides a transaction slip to the card-terminal-specific mobile communication terminal when the result of the direct payment approval is received from the card company system.

The virtual card information includes disposable virtual card information (a one-time card number (OTC)).

When the actual card information of the normal financial card is not SAM-encrypted upon storage of the actual card information, the card-terminal-specific mobile communication terminal SAM-encrypts and stores the actual card information, transmits the SAM-encrypted actual card information in addition to the virtual card terminal information when the virtual card terminal information is transmitted to the payment-terminal-specific mobile communication terminal; the payment-terminal-specific mobile communication terminal transmits actual card information request information including the virtual card terminal information including the SAM-encrypted actual card information to the provisional-approval terminal management server; and the provisional-approval terminal management server decrypts the SAM-encrypted actual card information and then provides the decrypted actual card information to the payment-terminal-specific mobile communication terminal.

The payment-terminal-specific mobile communication terminal generates and provides a transaction slip to the card-terminal-specific mobile communication terminal when the result of the direct payment approval is received in response to the payment approval request.

The payment-terminal-specific mobile communication terminal transmits payment processing request information including card terminal identification information, virtual card information, transaction information, and payment terminal identification information included in the virtual card terminal information to the provisional-approval terminal management server when the virtual card terminal information is read, and receives the result of the direct payment approval from the card company system in response to the transmission; and the provisional-approval terminal management server receives the payment processing request information, writes a transaction statement based on the virtual card information included in the payment processing request information, and transmits direct payment approval request information including the transaction statement to the card company system to request a direct payment approval.

The card-terminal-specific mobile communication terminal includes a biometric information acquisition unit configured to acquire biometric information of the user, the card-terminal-specific mobile communication terminal performs a user authentication when a card payment event occurs, and receives a financial card selected to be used for the payment when the user authentication is successful, and a means for the user authentication is a biometric information user authentication means for comparing the biometric information acquired through the biometric information acquisition unit with prestored biometric information and performing the user authentication depending on a result of the comparison.

The card-terminal-specific mobile communication terminal performs a user authentication when a card payment event occurs, and receives a financial card selected to be used for the payment when the user authentication is successful, and a means for the user authentication is a personal identification number user authentication means for comparing a personal identification number input through an input unit with a prestored personal identification number and performing the user authentication depending on a result of the comparison.

In order to achieve the above objectives, a mobile card payment method for performing a card payment between mobile communication terminals on the basis of a phone-to-phone payment concept according to the present disclosure includes: a card payment terminal registration process in which a provisional-approval terminal management server receives a member shop payment terminal approval request including an app ID corresponding to an installation of a member shop card payment terminal app from a payment-terminal-specific mobile communication terminal, performs an authentication according to the app ID, acquires payment terminal registration information from the payment-terminal-specific mobile communication terminal, allows the member shop card payment terminal app to be run, provides unique payment terminal identification information to the payment-terminal-specific mobile communication terminal and allows the payment-terminal-specific mobile communication terminal to store the unique payment terminal identification information when the member shop card payment terminal app is running, provides a payment terminal registration log including the unique payment terminal identification information to a card company system, and registers the payment-terminal-specific mobile communication terminal as a member shop card payment terminal; a virtual card information acquisition process in which a card-terminal-specific mobile communication terminal requests issuance of a virtual financial card from a card company system corresponding to card company information included in card marker information for a selected financial card when a card payment event occurs, and receives and acquires virtual card information of the financial card in response to the request; a virtual card information payment request process in which the registered payment-terminal-specific mobile communication terminal reads virtual card terminal information including the virtual card information from the card-terminal-specific mobile communication terminal and then transmits a payment processing request signal additionally including payment terminal identification information to the provisional-approval terminal management server; a direct payment approval request process in which the provisional-approval terminal management server transmits a direct payment approval request signal corresponding to the virtual card information to the card company system when the payment processing request signal is received; and a payment approval process in which the card company system processes a payment approval for the financial card corresponding to the virtual card information included in the direct payment approval request signal when the direct payment approval request signal is received, and transmits a result of the direct payment approval.

The card payment terminal registration process includes an app approval step in which the provisional-approval terminal management server performs an app ID authentication by using the app ID when member shop card payment terminal app approval request information including the app ID of the installed member shop card payment terminal app is received from the payment-terminal-specific mobile communication terminal due to an occurrence of a payment terminal registration event caused by the installation of the member shop card payment terminal app, and provides app use approval information to the payment-terminal-specific mobile communication terminal when the authentication is successful; a payment terminal registration information acquisition step in which after the app is approved, the provisional-approval terminal management server requests, receives, and acquires the payment terminal registration information from the payment-terminal-specific mobile communication terminal; a member shop card payment terminal app use allowance step in which the provisional-approval terminal management server generates member shop card payment terminal app installation authentication code, provides the member shop card payment terminal app installation authentication code to the payment-terminal-specific mobile communication terminal, and allows the installed member shop card payment terminal app to be used; an app running monitoring step in which the provisional-approval terminal management server monitors whether a member shop card payment terminal app running signal is received from the payment-terminal-specific mobile communication terminal to monitor whether the member shop card payment terminal app is running; and a registration step in which when the app is running, the provisional-approval terminal management server registers a member shop and the payment-terminal-specific mobile communication terminal as a payment terminal, generates the unique payment terminal identification information, provides the unique payment terminal identification information to the payment-terminal-specific mobile communication terminal to allow the payment-terminal-specific mobile communication terminal to store the unique payment terminal identification information, and provides the payment terminal registration log to the card company system to register the payment-terminal-specific mobile communication terminal as a card payment terminal.

The virtual card information acquisition process includes a virtual financial card issuance request step in which when virtual financial card marker information of the virtual financial card is selected upon the occurrence of the card payment event, the card-terminal-specific mobile communication terminal requests issuance of the virtual financial card from a card company system corresponding to card company information included in the virtual financial card marker information; a virtual card information provision step in which when the request to issue the financial card is generated, the card company system loads actual card information stored and mapped to card terminal identification information received from the card-terminal-specific mobile communication terminal, generates virtual card information for the loaded actual card information, and provides the virtual card information to the card-terminal-specific mobile communication terminal; and a virtual card information acquisition step in which the card-terminal-specific mobile communication terminal receives and stores the virtual card information.

The virtual card information payment request process includes a virtual card terminal information input monitoring step in which the payment-terminal-specific mobile communication terminal checks whether the virtual card terminal information including the virtual card information is read from the card-terminal-specific mobile communication terminal; a virtual card information detection step in which when the virtual card terminal information is input, the payment-terminal-specific mobile communication terminal detects the virtual card information and card terminal identification information from the virtual card terminal information; and a virtual card information payment request step in which the payment-terminal-specific mobile communication terminal generates a payment processing request signal including actual card information request information including the virtual card information, the card terminal identification information, the app ID, and the payment terminal identification information and transmits the payment processing request signal to the provisional-approval terminal management server; the mobile card payment method further includes an actual card information acquisition process in which when the payment processing request signal including the actual card information request information is received, the provisional-approval terminal management server transmits actual card information request information including the virtual card information to the card company system, receives actual card information corresponding to the virtual card information from the card company system in response to the transmission, and provides the actual card information to the payment-terminal-specific mobile communication terminal; and the direct payment approval request includes a transaction statement writing step in which the payment-terminal-specific mobile communication terminal receives the actual card information from the provisional-approval terminal management server and writes a transaction statement based on the actual card information; and a payment approval request step in which the payment-terminal-specific mobile communication terminal transmits a direct payment approval request signal including the transaction statement to the card company system.

The actual card information acquisition process includes a validity check step in which the provisional-approval terminal management server checks validity of the payment terminal identification information and the app ID included in the actual card information request information when the actual card information request information is received; a card information authentication step in which when it is determined, through the validity check for the app ID and the payment-terminal-specific mobile communication terminal associated with the payment terminal identification information, that a mobile card payment app installed in the payment-terminal-specific mobile communication terminal is valid, the provisional-approval terminal management server determines whether the virtual card information received for the card-terminal-specific mobile communication terminal corresponding to the card terminal identification information and the virtual card information for the card-terminal-specific mobile communication terminal issued by the card company system match each other; and an actual card information request step in which when the virtual card information received from the payment-terminal-specific mobile communication terminal and the virtual card information received from the card company system match each other, the provisional-approval terminal management server transmits the actual card information request information including the virtual card information to the card company system.

The virtual card information payment request process includes a virtual card terminal information input monitoring step in which the payment-terminal-specific mobile communication terminal checks whether the virtual card terminal information including the virtual card information is read from the card-terminal-specific mobile communication terminal; a virtual card information detection step in which when the virtual card terminal information is input, the payment-terminal-specific mobile communication terminal detects the virtual card information and card terminal identification information from the virtual card terminal information; and a virtual card information payment request step in which the payment-terminal-specific mobile communication terminal generates a payment processing request signal including payment processing request information including the virtual card information, the card terminal identification information, the app ID, and the payment terminal identification information and transmits the payment processing request signal to the provisional-approval terminal management server; the direct payment approval request process includes: a transaction statement writing step in which the provisional approval terminal management server writes a transaction statement based on transaction information and the virtual card information of the payment processing request information; and a payment approval request step in which the provisional approval terminal management server transmits a direct payment approval request signal including the transaction statement to the card company system; and during the payment approval process, the card company system provides a result of the direct payment approval to the provisional-approval terminal management server and the payment-terminal-specific mobile communication terminal.

The mobile card payment method further includes a card selection request process in which the card-terminal-specific mobile communication terminal requests a selection of one of a virtual financial card and a normal financial card. When the virtual financial card is selected, the virtual card information acquisition process is performed. When the normal financial card is selected, the mobile card payment method further includes an actual card information provision process in which the card-terminal-specific mobile communication terminal acquires actual card information of the normal financial card and transmits the acquired actual card information to the card company system.

The virtual card information includes disposable virtual card information (a one-time card number (OTC)).

In the direct payment approval process, the payment-terminal-specific mobile communication terminal receives a result of the direct payment approval corresponding to the payment approval processing from the card company system, generates a transaction slip (a receipt), and transmits the transaction slip to the card-terminal-specific mobile communication terminal, and the card-terminal-specific mobile communication terminal receives the transaction slip and displays the transaction slip on a display unit.

According to the present disclosure, it is possible to reduce the cost of establishing a card payment system by allowing a mobile communication terminal of a member shop to be used as a card payment terminal by just installing a member shop card payment terminal app therein so that the member shop does not have to purchase a plurality of dedicated card payment terminals and configure a plurality of VAN communication networks.

Also, according to the present disclosure, it is possible to vitalize the use of mobile financial cards by allowing a mobile communication terminal to be used as a card payment terminal.

Also, according to the present disclosure, it is possible to receive promotion services, such as a point earning service, a discount service, a coupon provision service, and other earning services, that are not applicable on the basis of randomly issued virtual card information and that are provided by member shops, card operators, or other product providers by acquiring virtual card information itself even when the virtual card information is applied or acquiring actual card information before a final transaction statement is written to perform a mobile financial card payment, and thus possible to apply similar promotion services even when mobile financial cards based on virtual card information are used, like actual financial cards.

According to the present disclosure, international Europay MasterCard Visa (EMV) authentication need not be performed, and thus costs and royalties for Europay MasterCard Visa (EMV) terminal authentication and domestic terminal authentication do not have to be paid. Accordingly, it is possible to reduce domestic and international cost overflows.

According to the present disclosure, it is convenient for a user to directly receive an electronic receipt through a card-terminal-specific mobile communication terminal, and also it is possible to reduce consumption of paper resources and thus reduce a card payment system maintenance cost because paper receipts do not have to be issued.

According to the present disclosure, card payment means for selling and purchasing used products between normal individual users may be provided by allowing a mobile communication terminal to be used as a card payment terminal by just installing a member shop card payment terminal app therein, and thus it is possible to vitalize transactions for used products between individuals and facilitate the use of cards.

According to the present disclosure, it is possible to directly send or receive cash between a seller and a purchaser, that is, between a sender and a receiver on the basis of a phone-to-phone method when a credit caused by a card payment is converted into cash.

Hereinafter, a configuration and an operation of a mobile card payment system for performing a card payment between mobile communication terminals according to the present disclosure and a card payment method in the system will be described with reference to the accompanying drawings.

FIG. 1 is a view showing a configuration of a mobile card payment system for performing a card payment between mobile communication terminals according to the present disclosure.

Referring to FIG. 1, a mobile card payment system for performing a card payment between mobile communication terminals according to the present disclosure includes a card-terminal-specific mobile communication terminal 100, a payment-terminal-specific mobile communication terminal 200, a provisional-approval terminal management server 300, and a card company system 400.

The card-terminal-specific mobile communication terminal 100, the payment-terminal-specific mobile communication terminal 200, the provisional-approval terminal management server 300, and the card company system 400 are connected to a wired/wireless data communication network 500 in a wired or wireless manner to perform data communication with each other.

The wired/wireless data communication network 500 is a communication network which is a combination of at least one or more of an Internet network including a WiFi network, a mobile communication network such as 3-generation (3G), 4G, and 5G networks, a Wibro network, and a dedicated network.

The card-terminal-specific mobile communication terminal 100 and the payment-terminal-specific mobile communication terminal 200 are each a mobile communication terminal, such as a smartphone, having a mobile operating system (OS) on which various applications (hereinafter also referred to as apps) may be installed, and classified depending on whether a mobile card payment app or a member shop card payment terminal app is installed.

The card-terminal-specific mobile communication terminal 100 has a mobile card payment app according to the present disclosure installed therein and is used as a mobile card payment means according to the present disclosure. A plurality of financial cards may be registered through the mobile card payment app. The financial cards to be registered according to the present disclosure may include virtual financial cards, normal financial cards (e.g., a digital financial card and an actual financial card), etc. The virtual financial card is a card capable of receiving virtual card information including a virtual card number from the card company system 400 and performing a payment. To this end, the card-terminal-specific mobile communication terminal 100 stores virtual financial card marker information including an image of a financial card, information regarding a card company that issues a virtual financial card, etc. The card-terminal-specific mobile communication terminal 100 may further store actual card information for normal financial cards.

When a virtual financial card is selected, the card-terminal-specific mobile communication terminal 100 accesses a corresponding card company system 400 and receives virtual card information by using card company information of mobile (virtual) financial card marker information for the selected virtual financial card. The virtual card information may be disposable, semi-permanent, or valid for a certain period according to a user's selection. However, it is preferable that the virtual card information be disposable for the purpose of security.

The payment-terminal-specific mobile communication terminal 200 has a member shop card payment terminal app according to the present disclosure installed therein. The payment-terminal-specific mobile communication terminal 200 acquires card information of a mobile financial card stored in the card-terminal-specific mobile communication terminal 100 according to the present disclosure and combines the acquired card information with price information of a sold product, thus performing an operation like a card payment terminal.

A unique app ID is allocated to and held by the member shop card payment terminal app when the member shop card payment terminal app is downloaded. The member shop card payment terminal app is run only when member shop card payment terminal app installation authentication code is received from the provisional-approval terminal management server 300.

The provisional-approval terminal management server 300 registers the payment-terminal-specific mobile communication terminal 200 as a card payment terminal according to the present disclosure. When a payment is made according to the virtual card information, the provisional-approval terminal management server 300 relays a payment processing based on the virtual card information between the payment-terminal-specific mobile communication terminal 200 and the card company system 400.

The card company system 400 is a system of any card company, which is a system for processing a payment approval through a financial card.

The card company system 400 may be a system of a single card company or a system of multiple card companies.

When a virtual card information issuance request is made by the card-terminal-specific mobile communication terminal 100, the card company system 400 according to the present disclosure generates virtual card information, provides the virtual card information to the card-terminal-specific mobile communication terminal 100, and additionally provides the virtual card information to the provisional-approval terminal management server 300 according to a first embodiment of the present disclosure.

Figure 2:
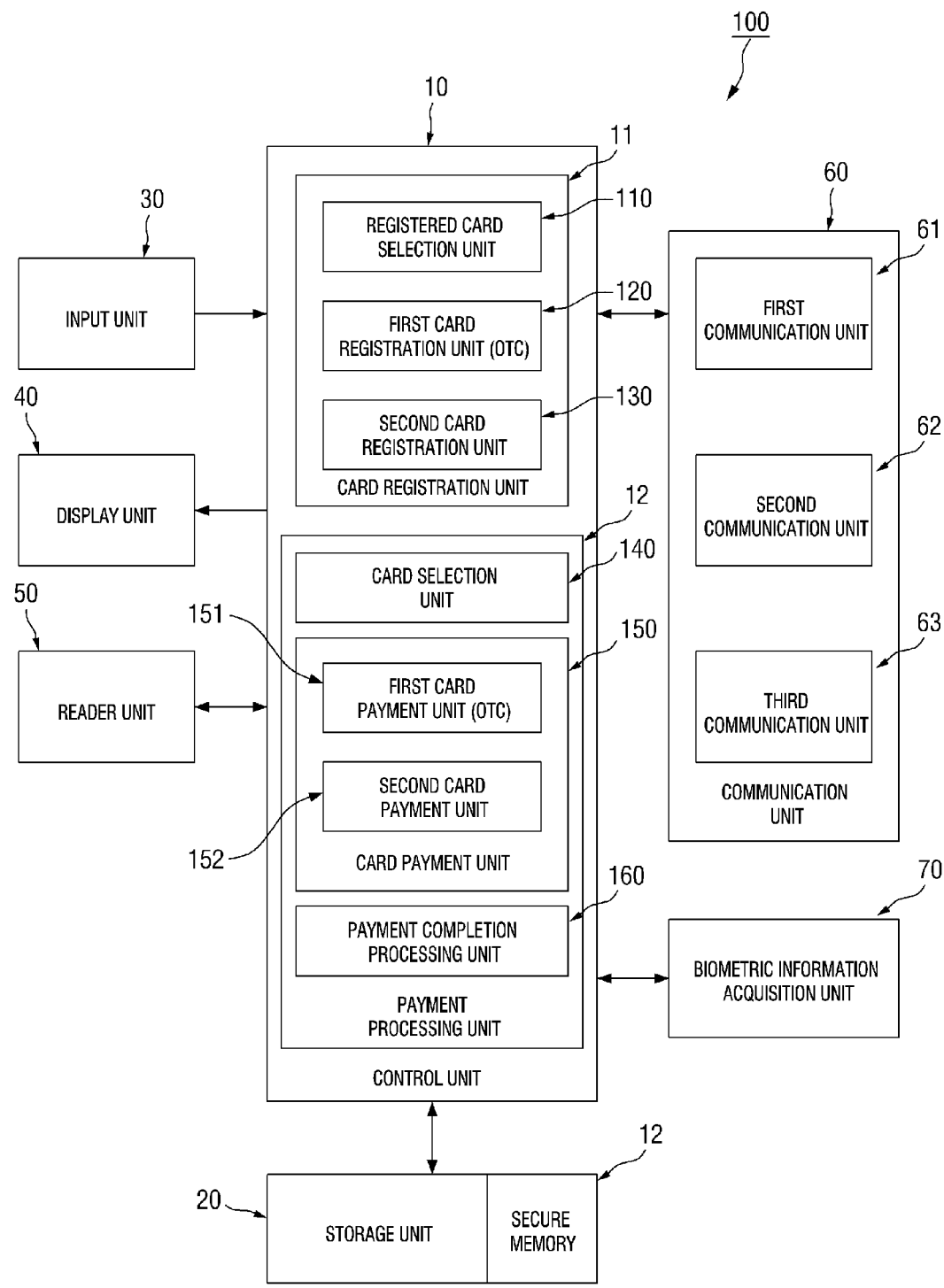
FIG. 2 is a view showing a configuration of a card-terminal-specific mobile communication terminal of a mobile card payment system according to the present disclosure.

FIG. 2 is a view showing a configuration of a card-terminal-specific mobile communication terminal of a mobile card payment system according to the present disclosure.

Referring to FIG. 2, the card-terminal-specific mobile communication terminal 100 may include a control unit 10, a storage unit 20, an input unit 30, a display unit 40, a reader unit 50, and a communication unit 60 and may further include a biometric information acquisition unit 70 depending on the embodiment.

The control unit 10 controls the overall operation of the card-terminal-specific mobile communication terminal 100 according to the present disclosure. A detailed configuration of the control unit 10 will be described later.

The storage unit 20 includes a control program region in which control programs (e.g., an OS and a mobile card payment app) according to the present disclosure are stored, a temporary region in which data generated while the control programs are executed is temporarily stored, a data region in which data generated by the control programs and the user is stored, etc.

The storage unit 20 may include a separate secure memory 21 configured to store virtual card information and mobile financial card marker information regarding a virtual financial card and a normal financial card. The secure memory 21 may be configured to be accessed only when a user authentication is successfully performed or only through a specified program. Also, the secure memory 21 executes integrity verification against a forgery of a mobile card payment app, a rooting and jailbreaking of a terminal, or the like periodically or upon an app execution.

The input unit 30 is configured with at least one of a button input device including multiple buttons to output a button signal corresponding to a pressed button, a key input device including multiple keys for entering and selecting a letter, a number, a function, and so on to output a key signal corresponding to a pressed key, a mouse or joystick device for moving a cursor position, and a touchpad integrally formed with a screen of the display unit 40 to output position data corresponding to a touched position. Thus, the input unit 30 provides information input means to a user.

The display unit 40 is a display device such as a liquid crystal display (LCD) and is configured to display information corresponding to an operating state of the card-terminal-specific mobile communication terminal 100 by using text, graphics, or the like, display user graphic interface means corresponding to a running app, and display various information with text, images, graphics, or the like by means of the user graphic interface means.

The reader unit 50 reads information from a contact or non-contact short-range financial card and device and transmits information in an NFC or MST manner. According to the present disclosure, the reader unit 50 may transmit one of actual card information and virtual card information stored in the storage unit 20 to the payment-terminal-specific mobile communication terminal 200.

The communication unit 60 accesses the wired/wireless data communication network 500 to perform data communication with other systems connected to the wired/wireless data communication network 500.

The communication unit 60 may include a first communication unit 61 configured to access a WiFi network, which is an Internet network, to perform data communication in a wireless manner, a second communication unit 62 configured to access a mobile communication network in a wireless manner to perform data communication, and a third communication unit 63 configured to perform Bluetooth short-range wireless communication with other devices located in a short range, according to a configuration of the wired/wireless data communication network 500.

More specifically with regard to a configuration of the control unit 10 according to the present disclosure, the control unit 10 includes a card registration unit 11 and a payment processing unit 12.

The card registration unit 11 includes a registered card selection unit 110, a first card registration unit 120, and a second card registration unit 130.

The registered card selection unit 110 provides card type selection means for selecting the type of a card to be registered and runs one of the first card registration unit 120 and the second card registration unit 130 depending on the type of a card selected through the card type selection means.

When a virtual financial card is selected as a card to be registered by the registered card selection unit 110, the first card registration unit 120 provides virtual financial card registration means for entering virtual financial card marker information including card company information for providing a virtual financial card to be registered and virtual financial card selection information for allowing a user to select the virtual financial card, and also stores the entered virtual financial card marker information in the storage unit 20.

When a normal financial card is selected as a card to be registered by the registered card selection unit 110, the second card registration unit 130 provides financial card registration means for entering financial card marker information including actual card information of an actual financial card to be registered and financial card selection information for selecting an actual financial card to be registered, and also stores the entered financial card marker information in the storage unit 20. The actual card information may be acquired by means of the reader unit 50 and the input unit 30.

The virtual financial card selection information and the financial card selection information may each be text, an icon, a card image, or the like corresponding to a corresponding card company.

The card payment processing unit 12 includes a card selection unit 140, a card payment unit 150, and a payment completion processing unit 160.

The card selection unit 140 provides card type selection means for selecting a normal financial card and a virtual financial card and card selection means for selecting one of at least one normal financial card or at least one virtual financial card that is registered for each type of cards, and outputs the selected card type information and the selected financial card marker information.

The card payment unit 150 includes a first card payment unit 151 for performing a payment processing on the virtual financial card and a second card payment unit 152 for performing a payment processing on the normal financial card.

The first card payment unit 151 is activated when a virtual financial card is selected as the card type by the card selection unit 140. When the first card payment unit 151 is activated, the first card payment unit 151 processes a card payment by requesting and receiving virtual card information from a card company system 400 corresponding to card company information included in virtual financial card marker information and providing the received virtual card information to the payment-terminal-specific mobile communication terminal 200.

The second card payment unit 152 is activated when a normal financial card is selected as the card type by the card selection unit 140. When the second card payment unit 152 is activated, the second card payment unit 152 processes a card payment by acquiring actual card information through one of the reader unit 50 and the input unit 30 or loading and acquiring actual card information prestored in the storage unit 20 and then providing the actual card information to the payment-terminal-specific mobile communication terminal 200.

After the payment processing is complete through the card payment unit 150, the payment completion processing unit 160 receives a transaction slip according to card payment completion, that is, a receipt from the payment-terminal-specific mobile communication terminal 200 and displays the receipt on the display unit 40. The receipt may be configured to be stored in the storage unit 20 and managed by a user.

The biometric information acquisition unit 70 acquires biometric information such as voices, fingerprints, irises, or the like from the user and outputs the biometric information to the control unit 10. The biometric information is applied to user authentication and may be stored and managed in the storage unit 20.

When the biometric information acquisition unit 70 is configured, the card registration unit 110 may acquire biometric information for each registered card whenever a card is registered and store the biometric information in the storage unit 20 or may acquire and store one piece of biometric information according to card payments.

Also, it is preferable that the payment processing unit 12 be configured to acquire user biometric information and perform a user authentication whenever a card payment event occurs and configured to process a card payment when the user authentication is successful.

As the user authentication method, a personal identification number (PIN) method in addition to the biometric information method may be utilized, and also various methods such as a certificate method may be utilized.

Figure 3:
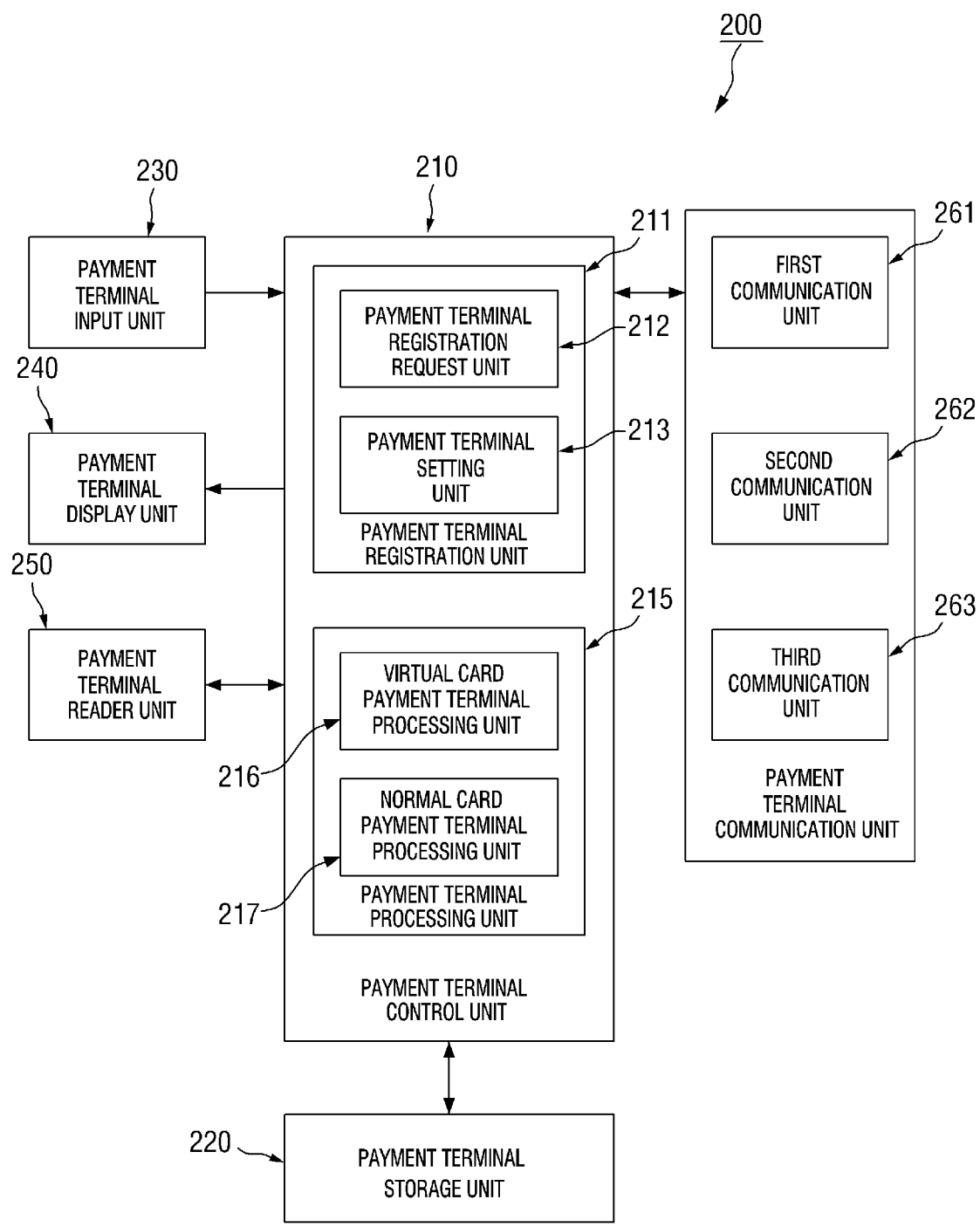
FIG. 3 is a view showing a configuration of a payment-terminal-specific mobile communication terminal of a mobile card payment system according to the present disclosure.

FIG. 3 is a view showing a configuration of a payment-terminal-specific mobile communication terminal of a mobile card payment system according to the present disclosure. In the following description with reference to FIG. 3, the same elements as those of FIG. 2 will be briefly described or not described at all.

A payment terminal storage unit 220 includes a program region in which control programs (e.g., an OS and a member shop card payment terminal app) according to the present disclosure are stored, a temporary region in which data generated while the control programs are executed is temporarily stored, and a data region in which data generated by the control programs and the user is stored.

In particular, the payment terminal storage unit 220 stores unique payment terminal identification information according to the present disclosure. It is preferable that the unique payment terminal identification information be stored in the program region or stored in a separate secure region such that the unique payment terminal identification information cannot be changed.

The payment-terminal-specific mobile communication terminal 200 includes a payment terminal control unit 210, the payment terminal storage unit 220, a payment terminal input unit 230, a payment terminal display unit 240, a payment terminal reader unit 250, and a payment terminal communication unit 260, identically or similarly to the card-terminal-specific mobile communication terminal 100.

The payment terminal control unit 210 includes a payment terminal registration unit 211 and a payment terminal processing unit 215 and controls the overall operation to function as a card payment terminal according to the present disclosure.

The payment terminal registration unit 211 includes a payment terminal registration request unit 212 and a payment terminal setting unit 213.

When a payment terminal registration event occurs, the payment terminal registration request unit 212 requests an approval of an installed member shop card payment terminal app from the provisional-approval terminal management server 300. When the approval is made by the provisional-approval terminal management server 300, the payment terminal registration request unit 212 displays payment terminal registration information input means on the payment terminal display unit 240, acquires payment terminal registration information, provides the acquired payment terminal registration information to the provisional-approval terminal management server 300, and requests registration of the acquired payment terminal registration information as a card payment terminal.

When the registration is requested as the card payment terminal, the payment terminal setting unit 213 may receive member shop card payment terminal app installation authentication code from the provisional-approval terminal management server 300, set the member shop card payment terminal app to be run, monitor whether the member shop card payment terminal app is running, transmit an app running signal to the provisional-approval terminal management server 300 when the app is running, receive unique identification information of a payment terminal corresponding to the app running signal from the provisional-approval terminal management server 300, and store the received unique identification information, thus allowing the payment-terminal-specific mobile communication terminal 200 to operate as the card payment terminal.

The payment terminal processing unit 215 includes a virtual card payment terminal processing unit 216 and a normal card payment terminal processing unit 217 according to the card type.

The virtual card payment terminal processing unit 216 processes a card payment by utilizing virtual card information of a virtual financial card. The card payment processing process of the virtual card payment terminal processing unit 216 will be described in detail with reference to FIGS. 7 and 9 on the basis of a case in which a payment approval is requested after virtual card information is converted into actual card information and each of first and third embodiments in which a payment approval is requested by only using virtual card information.

The normal card payment terminal processing unit 217 processes a card payment by utilizing actual card information of a normal financial card. The card payment processing process of the normal card payment terminal processing unit 217, which is a second embodiment, will be described in detail with reference to FIG. 8.

Figure 4:
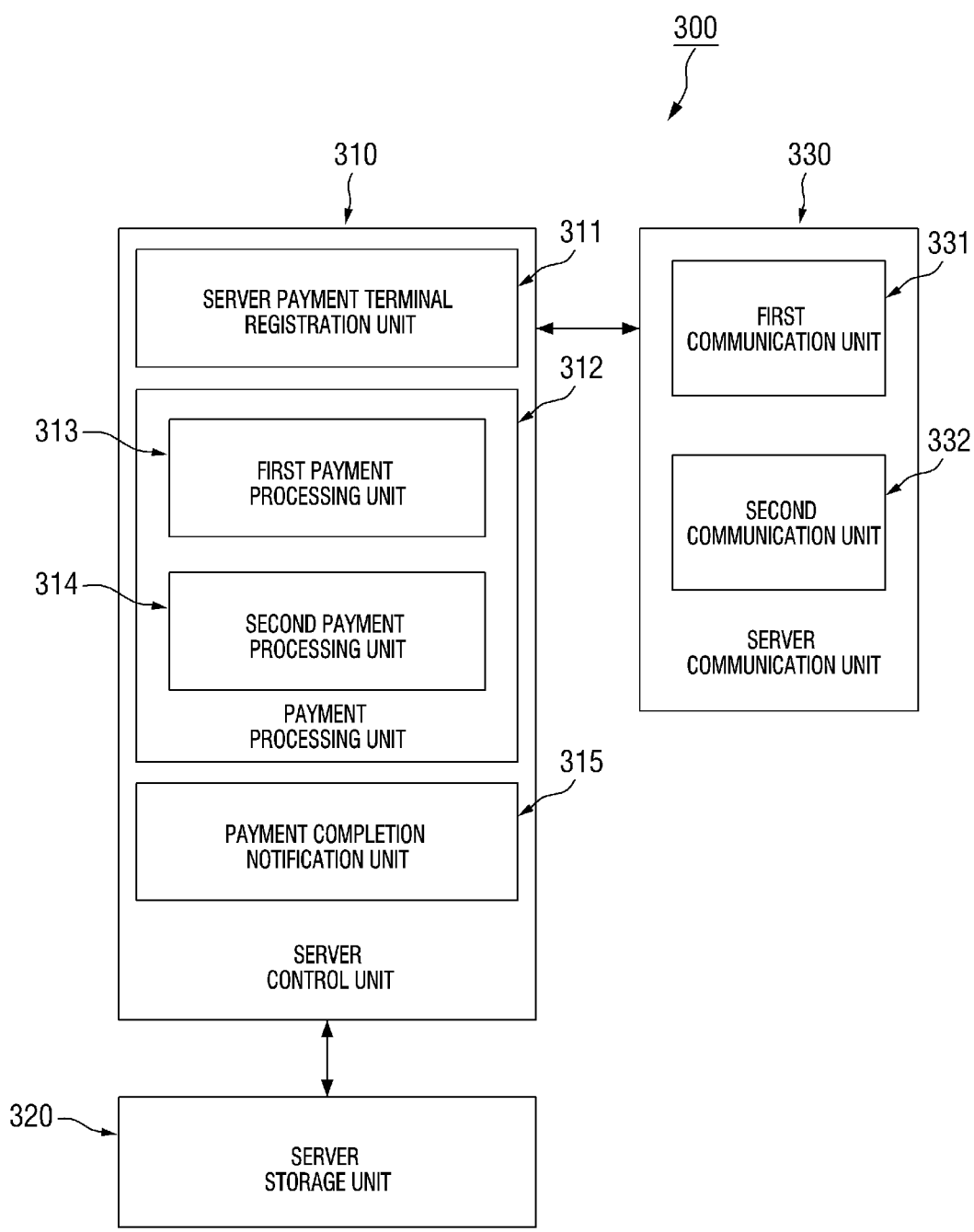
FIG. 4 is a view showing a configuration of a provisional-approval terminal management server of a mobile card payment system according to the present disclosure.

FIG. 4 is a view showing a configuration of a provisional-approval terminal management server of a mobile card payment system according to the present disclosure.

Referring to FIG. 4, the provisional-approval terminal management server 300 includes a server control unit 310, a server storage unit 320, and a server communication unit 330.

The server storage unit 320 includes a program storage region in which control programs according to the present disclosure are stored, a temporary region in which data generated while the control programs are executed is temporarily stored, and a data region in which data generated by the control programs and the user is stored.

In the data region of the server storage unit 320, member shop information, an app ID of a member shop card payment terminal app for each piece of payment terminal identification information, payment terminal identification information, member shop payment terminal installation authentication code, payment terminal registration logs, data associated thereto, and so on are stored and managed. The associated data may be information such as a date, a time, a counting position, a success, and a failure for each piece of payment terminal identification information, that is, regarding when the payment-terminal-specific mobile communication terminal is set as the card payment terminal.

The server communication unit 330 includes a first communication unit 331 for accessing the wired/wireless data communication network 500 in a wired manner and a second communication unit 332 for accessing the wired/wireless data communication network 500 in a wireless manner. The first communication unit 331 may be a local area network (LAN) device, and the second communication unit 332 may be a wireless LAN device.

The server control unit 310 includes a server payment terminal registration unit 311, a payment processing unit 312, and a payment completion notification unit 315.

The server payment terminal registration unit 311 registers the payment-terminal-specific mobile communication terminal 200 as a cart payment terminal. The registration method will be described in detail with reference to FIG. 5.

The payment processing unit 312 includes a first payment processing unit 313 and a second payment processing unit 314 depending on the card type and relay a card payment processing according to the present disclosure. The operation of the first payment processing unit 313 of the payment processing unit 312 will be described in detail with reference to FIGS. 7 and 9 depending on the embodiment, and the operation of the second payment processing unit 314 will be described in detail with reference to FIG. 8.

The payment completion notification unit 315 receives a result of a direct payment approval from the card company system 400 and stores the received result and then stores and manages the received result in the server storage unit 320.

The payment completion notification unit 315 may be configured to transmit the result of the direct payment approval to the payment-terminal-specific mobile communication terminal 200 according to the first and second embodiments.

Figure 5:
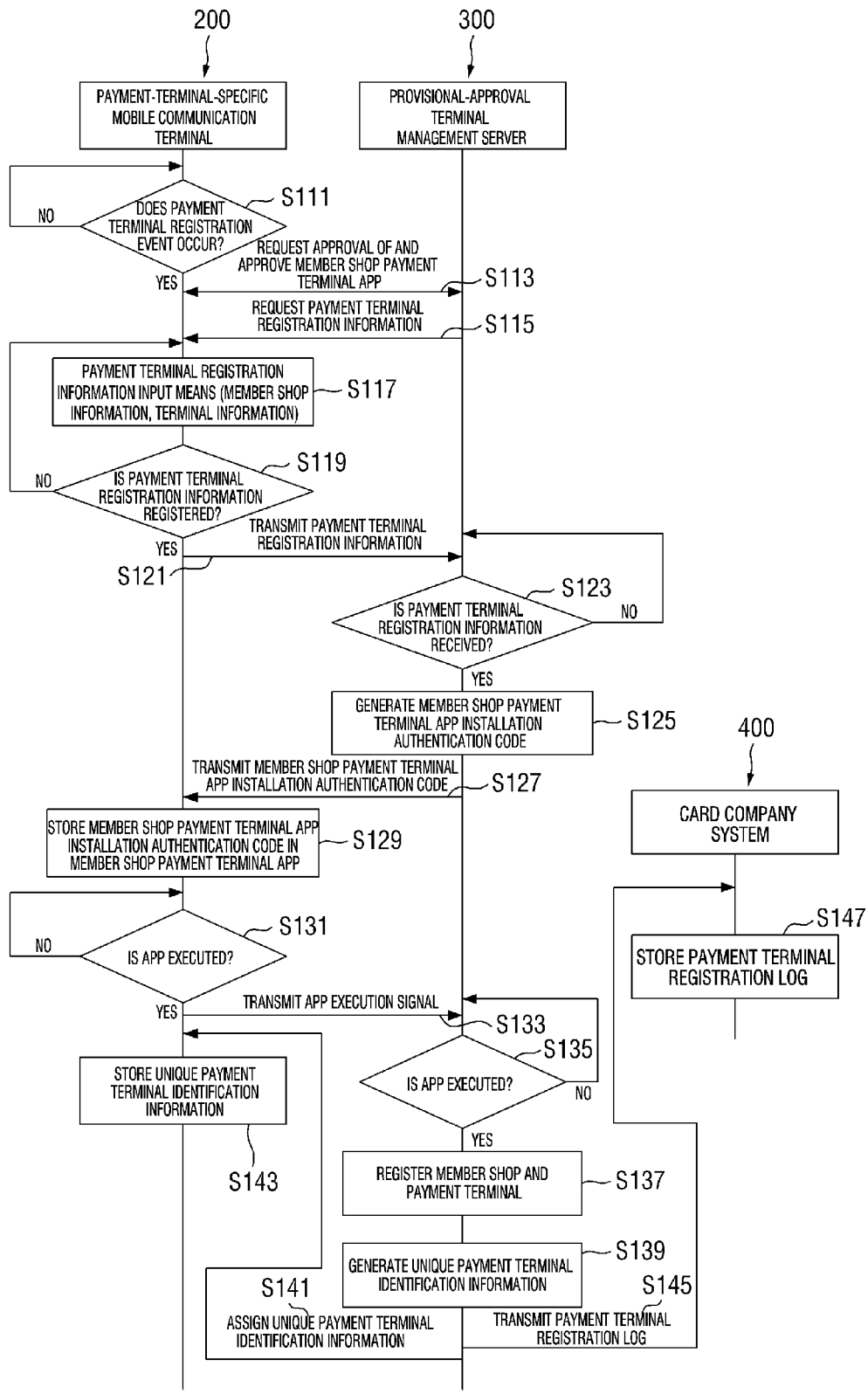
FIG. 5 is a sequence diagram showing a method of registering a mobile communication terminal of a member store as a card payment terminal to set the mobile communication terminal as a payment-terminal-specific mobile communication terminal in a mobile card payment method for performing a card payment between mobile communication terminals according to the present disclosure.

FIG. 5 is a sequence diagram showing a method of registering a mobile communication terminal of a member store as a card payment terminal to set the mobile communication terminal as a payment-terminal-specific mobile communication terminal in a mobile card payment method for performing a card payment between mobile communication terminals according to the present disclosure. The following description will be made with reference to FIGS. 3 to 5.

A payment terminal control unit 210 of a payment-terminal-specific mobile communication terminal 200 checks whether a payment terminal registration event occurs (S111). The payment terminal registration event occurs when a member shop card payment terminal app is installed or when the member shop card payment terminal app is executed after the installation.

When the payment terminal registration event occurs, a payment terminal registration unit 211 and a payment terminal processing unit 215 are configured in the payment terminal control unit 210 by the installation of the member shop card payment terminal app.

The payment terminal registration unit 211 transmits member shop card payment terminal app approval request information including an app ID of the installed member shop card payment terminal app to a provisional-approval terminal management server 300 according to the payment terminal registration event and requests an approval of the member shop card payment terminal app from the provisional-approval terminal management server 300. Then, the provisional-approval terminal management server 300 compares the app ID included in the member shop card payment terminal app approval request information with an app ID stored and mapped to payment terminal identification information of the payment-terminal-specific mobile communication terminal 200 upon installation of the payment-terminal-specific mobile communication terminal, performs an authentication according to whether the app IDs match each other, and then approves the member shop card payment terminal app (S113). The app ID may be stored in a separate app store server (not shown) capable of providing that member shop card payment terminal app.

After the approval of the app, a server payment terminal registration unit 311 of the provisional-approval terminal management server 300 requests payment terminal registration information from the payment-terminal-specific mobile communication terminal 200 (S115).

When the payment terminal registration information is requested by the provisional-approval terminal management server 300, a payment terminal registration request unit 212 of the payment terminal registration unit 211 displays payment terminal registration information input means on a payment terminal display unit 240 to request an input of the payment terminal registration information (S117). The payment terminal registration information includes member shop information and mobile communication terminal information of the payment-terminal-specific mobile communication terminal 200.

After the payment terminal registration information input means is displayed, the payment terminal registration request unit 212 checks whether the payment terminal registration information is requested to be registered by means of the payment terminal registration information input means (S119) and transmits the payment terminal registration information to the provisional-approval terminal management server 300 when the registration request is made (S121).

After the payment terminal registration information is requested (S115), the server payment terminal registration unit 311 of the provisional-approval terminal management server 300 monitors whether the payment terminal registration information is received (S123), generates member shop card payment terminal app installation authentication code when the payment terminal registration information is received (S125), and then transmits the member shop card payment terminal app installation authentication code to the payment-terminal-specific mobile communication terminal 200 (S127).

When the member shop card payment terminal app installation authentication code is received, the payment terminal registration request unit 212 of the payment-terminal-specific mobile communication terminal 200 transmits the member shop card payment terminal app installation authentication code to a payment terminal setting unit 213. Then, the payment terminal setting unit 213 stores the member shop card payment terminal app installation authentication code in the member shop card payment terminal app to enable the member shop card payment terminal app to be executed (S129).

After the member shop card payment terminal app installation authentication code is set, the payment terminal setting unit 213 checks whether the app is executed (S131) and transmits an app running signal to the provisional-approval terminal management server 300 when the app is executed (S133).

After the member shop card payment terminal app installation authentication code is transmitted, the server payment terminal registration unit 311 of the provisional-approval terminal management server 300 monitors whether the app is running depending on whether the app running signal is received from the payment-terminal-specific mobile communication terminal 200 (S135). When the app is running, the server payment terminal registration unit 311 registers a payment-terminal-specific mobile communication terminal corresponding to payment terminal identification information of the payment terminal registration information as a card payment terminal of a member shop corresponding to the member shop information included in the payment terminal registration information (S137).

When the registration of the member shop and the payment terminal is complete, the provisional-approval terminal management server 300 generates unique payment terminal identification information (S139) and then assigns the unique payment terminal identification information to the payment-terminal-specific mobile communication terminal 200 (S141).

Then, the payment terminal setting unit 213 stores the unique payment terminal identification information in the member shop card payment terminal app, thereby completing payment terminal settings (S143).

Also, after or while the unique payment terminal identification information is assigned to the payment-terminal-specific mobile communication terminal 200, the server payment terminal registration unit 311 transmits a payment terminal registration log including the unique payment terminal identification information and the payment terminal identification information of the payment-terminal-specific mobile communication terminal 200 to a card company system 400 (S145).

Then, the card company system 400 stores the payment terminal registration log, thereby completing the payment terminal registration of the payment-terminal-specific mobile communication terminal 200 (S147).

Figure 6:
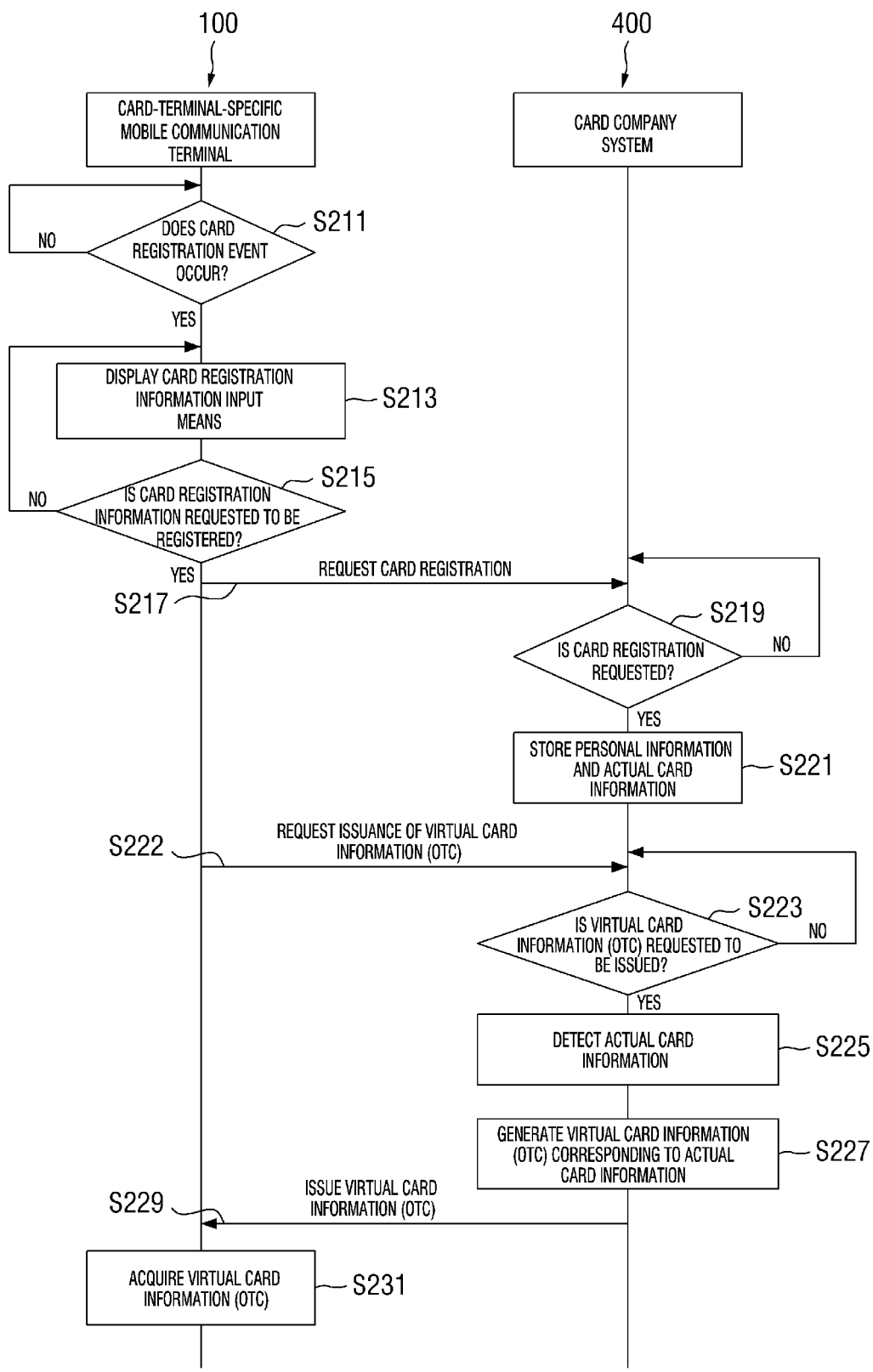
FIG. 6 is a sequence diagram illustrating the concepts of application of a service, registration of an actual financial card, and issuance of virtual card information in a mobile card payment method for performing a card payment between mobile communication terminals according to the present disclosure.

FIG. 6 is a sequence diagram illustrating the concepts of application of a service, registration of an actual financial card, and generation of virtual card information in a mobile card payment method for performing a card payment between mobile communication terminals according to the present disclosure, which is a diagram illustrating the concept of registration of a virtual financial card.

Referring to FIG. 6, a control unit 10 of a card-terminal-specific mobile communication terminal 100 checks whether a virtual financial card registration event occurs (S211). The card registration event may occur by selecting a virtual financial card registration button and menu of user graphic interface means when a mobile card payment app is executed.

When the card registration event occurs, a first card registration unit 120 displays virtual financial card registration information input means (S213). The virtual financial card registration information input means may include virtual financial card marker information input means. The virtual financial card marker information may include card company information and virtual financial card selection information, as described above.

When the card registration information input means is displayed, the first card registration unit 120 checks whether card registration information is requested to be registered (S215).

When the card registration information is requested to be registered, the first card registration unit 120 transmits card registration request information including acquired card registration information to a card company system 400 (S217). The card registration information may include personal information of a user, such as a name, an address, a phone number, and unique personal identification information, card terminal identification information of a card-terminal-specific mobile communication terminal, etc., and may further include actual card information of an actual financial card corresponding to a virtual financial card. Since the card company system has the actual card information, the card company system 400 may load and apply actual card information corresponding to the personal information or the card terminal identification information.

The card company system 400 monitors an occurrence of a card registration request (S219) and stores personal user information and actual card information when the card registration request information is received during the monitoring (S221).

After the user performs a registration in a virtual financial card service through the card-terminal-specific mobile communication terminal 100 according to the above-described process, the card-terminal-specific mobile communication terminal 100 transmits virtual card information (including an OTC) issuance request information including its own card terminal identification information to the card company system 400 when a payment is requested by means of the card-terminal-specific mobile communication terminal 100 (S222).

The card company system 400 checks whether a virtual card information issuance request is made by the card-terminal-specific mobile communication terminal 100 of the user that is registered in the virtual financial card service (S223).

When virtual card issuance request information is received from any card-terminal-specific mobile communication terminal 100 while the virtual card information issuance request is monitored, the card company system searches for and loads registered actual card information corresponding to card terminal identification information included in the virtual card issuance request information (S225) and randomly generates virtual card information by replacing the loaded actual card information with the virtual card information (S227). The virtual card information may be semi-permanent information as described above, stationary information with a token type, such as information applicable during only a certain period, or one-time card number (OTC), which is disposable random information.

When the virtual card information is generated, the card company system 400 transmits the generated virtual card information to the card-terminal-specific mobile communication terminal 100 (S229).

When the virtual card information is received, the card-terminal-specific mobile communication terminal 100 may store the virtual card information in a storage unit 20 and manage the virtual card information according to a period of use of the virtual card information (i.e., disposable, for a valid period, or semi-permanent) (S231). In the case of disposable virtual card information, the card-terminal-specific mobile communication terminal 100 deletes the virtual card information or disallows the use of the virtual card information once the virtual card information is used.

Figure 7:
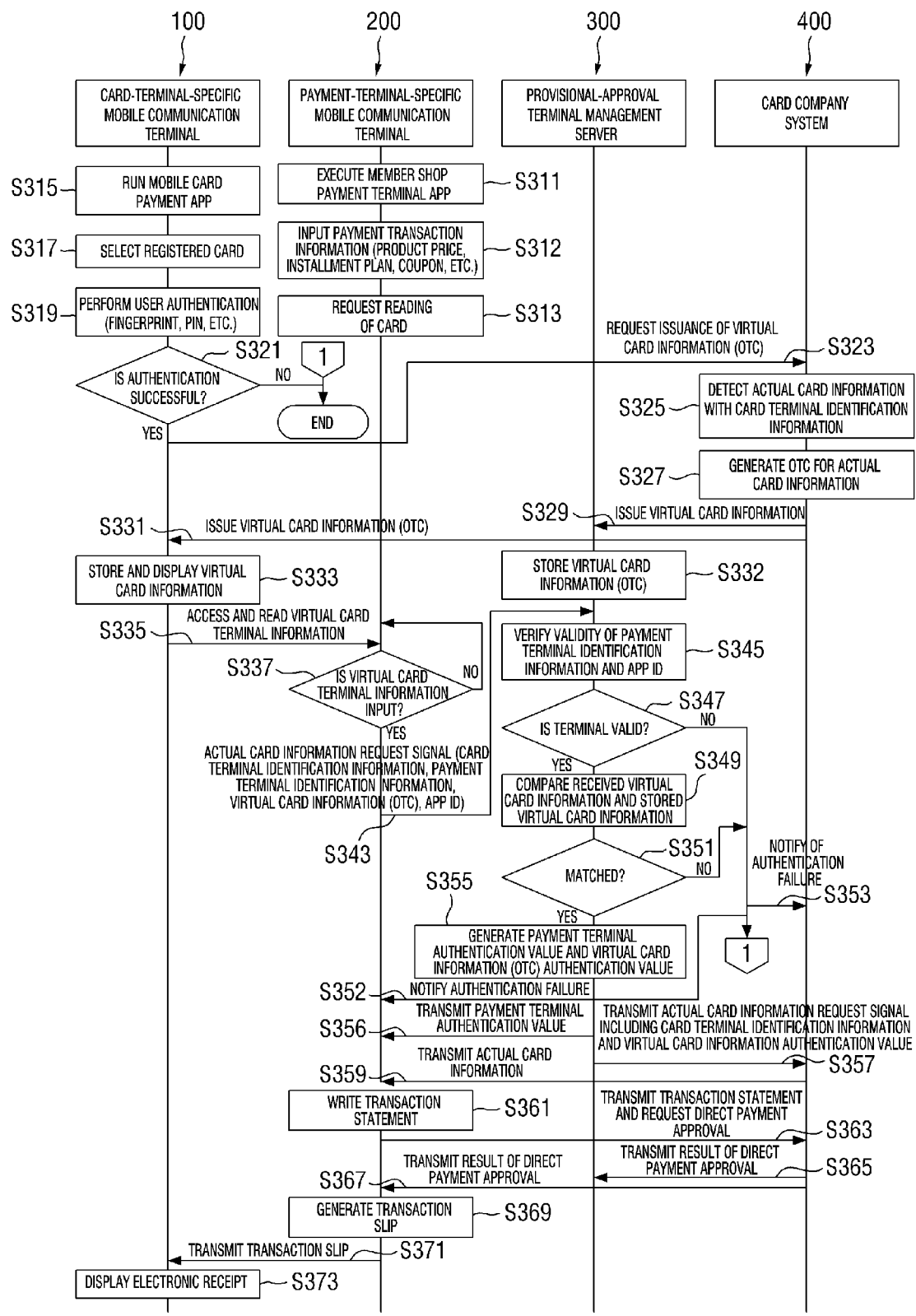
FIG. 7 is a sequence diagram showing a mobile card payment method for performing a card payment between mobile communication terminals when virtual card information is used according to a first embodiment of the present disclosure.

FIG. 7 is a sequence diagram showing a mobile card payment method for performing a card payment between mobile communication terminals when virtual card information is used according to a first embodiment of the present disclosure, which shows a method of converting the virtual card information into actual card information of an actual financial card and then using the actual card information upon a request for a direct payment approval.

Referring to FIG. 7, a payment-terminal-specific mobile communication terminal 200 located at a member shop may receive a member shop card payment terminal app execution request from a seller and run a member shop card payment terminal app (S311).

When the member shop card payment terminal app is running, the payment-terminal-specific mobile communication terminal 200 may acquire payment transaction information (S313).

When the transaction information is acquired, the payment-terminal-specific mobile communication terminal 200 may make a card reading request (S313). That is, the payment-terminal-specific mobile communication terminal 200 may be in a card payment standby state.

A user may purchase a product at the member shop and may execute a mobile card payment app installed in a card-terminal-specific mobile communication terminal 100 to pay for the purchased product. Then, the card-terminal-specific mobile communication terminal 100 runs the mobile card payment app (S315) and activates a card selection unit 130 by running the mobile card payment app, requests the user to select one of one or more registered mobile financial cards, and receives one card selected by the user (S317). In this case, the type of the selected card may be a virtual financial card.

When the card is selected, a first card payment unit 151 of a control unit 10 of the card-terminal-specific mobile communication terminal 100 performs a user authentication (S319) and determines whether a result of the user authentication is successful (S321). As described above, a method of using biometric information such as fingerprints and irises, a PIN method, and a certificate method may be applied to the user authentication.

When the authentication fails, the first card payment unit 151 notifies of the authentication failure and ends the process.

However, when the authentication is successful, the first card payment unit 151 transmits virtual card information issuance request information to a card company system 400 included in mobile (virtual) financial card marker information for the selected virtual financial card (S323).

When the virtual card information issuance request information is received, the card company system 400 searches for and loads actual card information corresponding to card terminal identification information included in the virtual card information issuance request information (S325) and generates virtual card information for the loaded actual card information (S327).

When the virtual card information is generated, the card company system 400 transmits the generated virtual card information to the card-terminal-specific mobile communication terminal 100 and a provisional-approval terminal management server 300 (S329 and S331).

The provisional-approval terminal management server 300 stores and manages the virtual card information in addition to the card terminal identification information (S332).

When the virtual card information is received, the card-terminal-specific mobile communication terminal 100 may store the virtual card information in a storage unit 20 and may display the virtual card information or information indicating that the virtual card information has been received (S333).

When the virtual card information is stored, the user may bring the card-terminal-specific mobile communication terminal 100 into contact or close proximity to the payment-terminal-specific mobile communication terminal 200. Then, the payment-terminal-specific mobile communication terminal 200 accesses the card-terminal-specific mobile communication terminal 100 and reads virtual card terminal information including the virtual card information and the terminal identification information (S335).

The payment-terminal-specific mobile communication terminal 200 checks whether the virtual card terminal information is input (S337) and transmits an actual card information request signal including actual card information request information to the provisional-approval terminal management server 300 when the virtual card terminal information is input (S343). The actual card information request information includes card terminal identification information, virtual card information, payment terminal identification information, an app ID of a member shop payment terminal app, etc.

When the actual card information request is received, the provisional-approval terminal management server 300 verifies validity of the payment terminal identification information and the app ID (S345) and determines whether the payment-terminal-specific mobile communication terminal 200 is valid and whether the app installed in the payment-terminal-specific mobile communication terminal 200 is valid (S347).

When a result of the determination is that the payment-terminal-specific mobile communication terminal 200 and the app are valid, the provisional-approval terminal management server 300 compares the virtual card information received from the card-terminal-specific mobile communication terminal 100 with the virtual card information received from the card company system 400 (S349) and determines whether they match each other (S351).

When the validity check and the virtual card information matching verification fail, the provisional-approval terminal management server 300 transmits the authentication failure to the payment-terminal-specific mobile communication terminal 200 (S352) and transmits the authentication failure to the card company system 400 (S353). In this case, when the virtual card information is disposable virtual card information (an OTC), the card company system 400 may delete the virtual card information or disallow the use of the virtual card information.

However, when the verification and the authentication are successful, the provisional-approval terminal management server 300 generates a payment terminal authentication value and a virtual card information authentication value (S355), transmits the generated payment terminal authentication value to the payment-terminal-specific mobile communication terminal 200 (S356), and transmits an actual card information request signal containing actual card information request information including card terminal identification information and a virtual card authentication value to the card company system 400 (S357).

When the actual card information request signal is received, the card company system 400 provides actual card information corresponding to virtual card information included in the actual card information request information of the actual card information request signal to the payment-terminal-specific mobile communication terminal 200 (S359).

When the payment terminal authentication value and the actual card information are received, the payment-terminal-specific mobile communication terminal 200 receives an approval of the use of the provisional-approval terminal management server 30 and writes payment request information (a transaction statement) (S361) and transmits payment approval request information including the written transaction statement to the card company system 400 to request a direct payment approval (S363).

The card company system 400 approves the payment according to the request of the direct payment approval and transmits a result of the direct payment approval to the provisional-approval terminal management server 300 and the payment-terminal-specific mobile communication terminal 200 (S365 and S367).

When the result of the direct payment approval is received, the payment-terminal-specific mobile communication terminal 200 generates a transaction slip by means of a payment completion processing unit 160 (S369) and provides the generated transaction slip to the card-terminal-specific mobile communication terminal 100 (S371).

When the transaction slip is received, the card-terminal-specific mobile communication terminal 100 displays the transaction slip on a display unit 40 (S373). The displayed transaction slip may be managed by being stored or deleted by the user.

Figure 8:
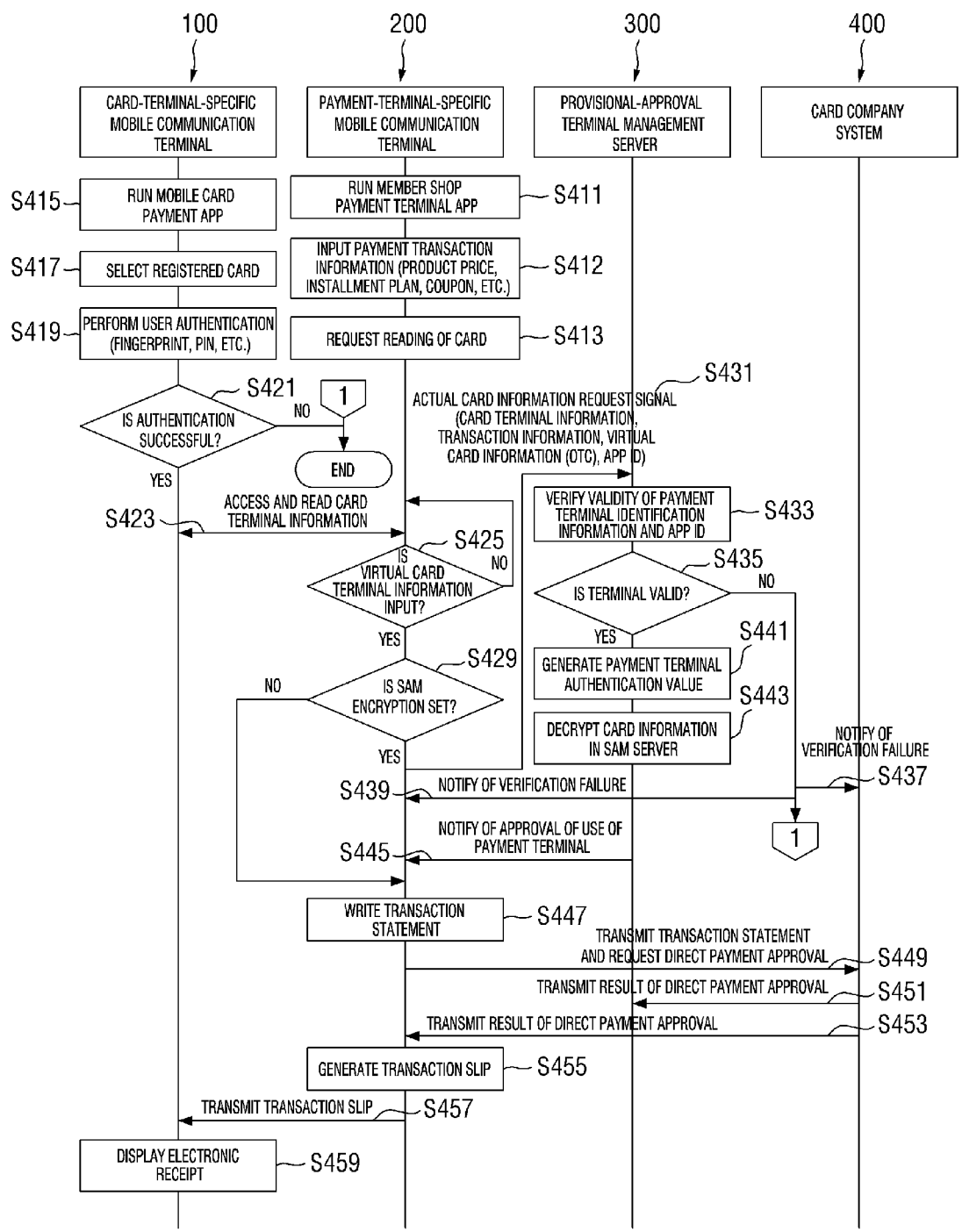
FIG. 8 is a sequence diagram showing a mobile card payment method for performing a card payment between mobile communication terminals when actual card information is used according to a second embodiment of the present disclosure.

FIG. 8 is a sequence diagram showing a mobile card payment method for performing a card payment between mobile communication terminals when actual card information is used according to a second embodiment of the present disclosure. In the following description with reference to FIG. 8, the same procedure as that of FIG. 7 will be briefly described or not described at all.

A user may select a normal financial card during a card selection (S417). When the normal financial card is selected and a user authentication is successful (S419 and S421), a second card payment unit 142 of the card-terminal-specific mobile communication terminal 100 may display an authentication success and may require the user to touch a card payment terminal. In this case, when the user touches the payment-terminal-specific mobile communication terminal 200, which is the card payment terminal, with the card-terminal-specific mobile communication terminal 100, the payment-terminal-specific mobile communication terminal 200 accesses the card-terminal-specific mobile communication terminal 100 and reads virtual card terminal information (S423). In this case, actual card information included in the virtual card terminal information may be SAM-encrypted information. When the actual card information is actual card information of a digital financial card, the card-terminal-specific mobile communication terminal 100 may receive SAM-encrypted actual card information from a corresponding card company system and store the received SAM-encrypted actual card information. However, when the actual card information is actual card information of an actual financial card, the card-terminal-specific mobile communication terminal 100 may perform an SAM encryption on the actual card information and then store the SAM-encrypted actual card information upon an input of the actual card information.

A normal card payment terminal processing unit 217 of the payment-terminal-specific mobile communication terminal 200 checks whether the virtual card terminal information is normally input (S425). When the virtual card terminal information is normally input, the normal card payment terminal processing unit 217 checks whether SAM is applied to the actual card information of the virtual card terminal information (S429). When SAM is applied, the actual card information may have been encrypted.

When SAM is applied, the normal card payment terminal processing unit 217 transmits actual card information request information including the actual card information, payment terminal identification information, and an app ID to the provisional-approval terminal management server 300 (S431).

When the actual card information request information is received, a second payment processing unit 314 of the provisional-approval terminal management server 300 checks validity of the payment terminal identification information and the app ID included in the actual card information request information (S433) and verifies whether the payment-terminal-specific mobile communication terminal 200 and the mobile card payment app are valid with respect to this service (S435).

When a result of the verification is that at least one of the payment-terminal-specific mobile communication terminal 200 and the mobile card payment app is not valid, the second payment processing unit 314 notifies the payment-terminal-specific mobile communication terminal 200 and the card company system 400 of an authentication failure (S437 and S439).

On the other hand, when the verification is successful, the second payment processing unit 314 generates a payment terminal authentication value (S441). After a SAM server (not shown) decrypts the actual card information (S443), the second payment processing unit 314 transmits a payment terminal use approval notification signal including the payment terminal authentication value and the actual card information to the payment-terminal-specific mobile communication terminal 200 (S445). Technology associated with the SAM is well known to those skilled in the art, and thus a detailed description thereof will be omitted.

Then, the normal card payment terminal processing unit 217 writes a transaction statement (S447), performs a payment approval through the card company system 400 (S449, S451, and S453), generates a transaction slip (S455), and provides the transaction slip to the card-terminal-specific mobile communication terminal 100 (S457).

Figure 9:
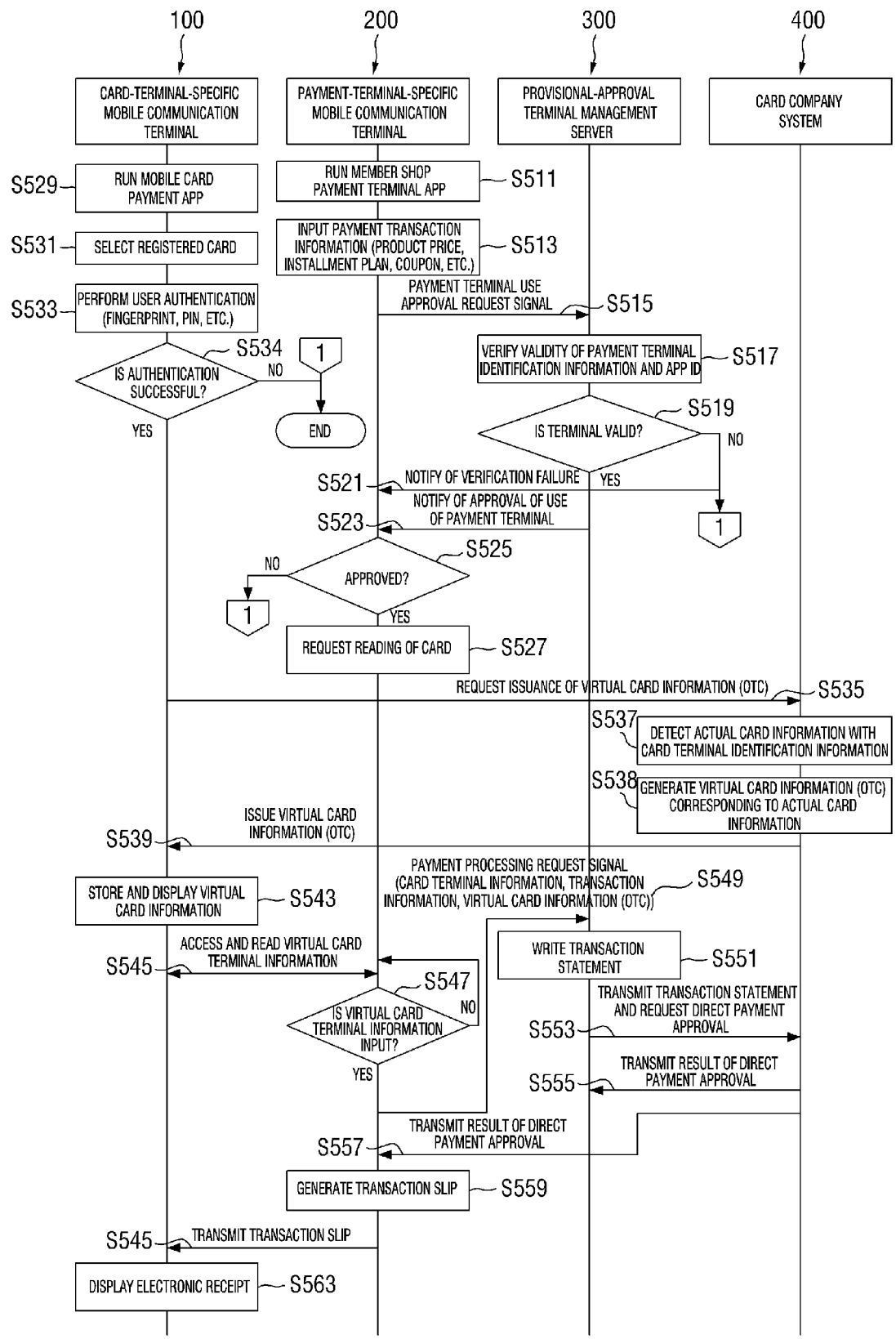
FIG. 9 is a sequence diagram showing a mobile card payment method for performing a payment between mobile communication terminals when virtual card information is used according to a third embodiment of the present disclosure.

FIG. 9 is a sequence diagram showing a mobile card payment method for performing a payment between mobile communication terminals when virtual card information is used according to a third embodiment of the present disclosure and also is a sequence diagram showing a method of completing a payment processing by only using virtual card information without actual financial card information being transmitted.

Referring to FIG. 9, a payment-terminal-specific mobile communication terminal 200 located at a member shop may receive a member shop card payment terminal app execution request from a seller and run a member shop card payment terminal app (S511).

When the member shop card payment terminal app is running, the payment-terminal-specific mobile communication terminal 200 may acquire transaction information associated with a payment (S513). The transaction information may be received and acquired from the seller through member shop card payment user graphic interface means that is generated by running the member shop card payment terminal app installed in the payment-terminal-specific mobile communication terminal 200. The transaction information may include a product name, a product price, an installment, the number of installment months, use of coupons, coupon information, etc.

When the transaction information is acquired, the payment-terminal-specific mobile communication terminal 200 transmits a payment terminal use approval request signal to the provisional-approval terminal management server 300 (S515). The payment terminal use approval request signal may include payment terminal identification information and an app ID.

When the payment terminal use approval request signal is received, the provisional-approval terminal management server 300 checks validity of the payment terminal identification information and the app ID included in the payment terminal use approval request signal (S517) and determines whether the payment-terminal-specific mobile communication terminal 200 is valid (S519).

When the payment-terminal-specific mobile communication terminal 200 is not valid, the provisional-approval terminal management server 300 transmits a verification failure notification signal to the payment-terminal-specific mobile communication terminal 200 (S521). When the payment-terminal-specific mobile communication terminal 200 is valid, the provisional-approval terminal management server 300 transmits a payment terminal use approval notification signal to the payment-terminal-specific mobile communication terminal 200 (S523).

When a notification signal is received from the provisional-approval terminal management server 300, the payment-terminal-specific mobile communication terminal 200 checks whether the notification signal is a payment terminal use approval notification signal to determine whether the approval is made (S525). When the approval is made, the payment-terminal-specific mobile communication terminal 200 makes a financial card reading request (S527). That is, the payment-terminal-specific mobile communication terminal 200 may be in a card payment standby state.

On the other hand, the user, that is, a purchaser purchases a product at the member shop and may execute the mobile card payment app installed in the card-terminal-specific mobile communication terminal 100 in order to pay for the purchased product. Then, the card-terminal-specific mobile communication terminal 100 runs the mobile card payment app (S529) and activates a card selection unit 130 by running the mobile card payment app, requests the user to select one of one or more registered mobile financial cards, and receives one card selected by the user (S531). In this case, the type of the selected card may be a virtual financial card.

When the card is selected, a first card payment unit 151 of a control unit 10 of the card-terminal-specific mobile communication terminal 100 performs a user authentication (S533) and determines whether a result of the user authentication is successful (S534). As described above, a method of using biometric information such as fingerprints and irises, a PIN method, and a certificate method may be applied to the user authentication.

When the authentication fails, the card-terminal-specific mobile communication terminal 100 may notify of, that is, displays the authentication failure and then ends the process.

However, when the authentication is successful, the first card payment unit 151 transmits virtual card information (OTC) issuance request information to a card company system 400 included in mobile (virtual) financial card marker information for the selected virtual financial card (S535).

When the virtual card information issuance request information is received, the card company system 400 searches for and loads actual card information corresponding to card terminal identification information included in the virtual card information issuance request information (S537) and generates virtual card information for the loaded actual card information (S538).

When the virtual card information is generated, the card company system 400 transmits the generated virtual card information to the card-terminal-specific mobile communication terminal 100 (S539).

When the virtual card information is received, the card-terminal-specific mobile communication terminal 100 may store the virtual card information in the storage unit 20 and may display the virtual card information or information indicating that the virtual card information has been received (S543).

When the virtual card information is stored, the user may bring the card-terminal-specific mobile communication terminal 100 into contact or close proximity to the payment-terminal-specific mobile communication terminal 200. Then, the payment-terminal-specific mobile communication terminal 200 accesses the card-terminal-specific mobile communication terminal 100 and reads virtual card terminal information including the virtual card information and the card terminal identification information (S545).

The payment-terminal-specific mobile communication terminal 200 checks whether the virtual card terminal information is input (S547) and transmits a payment processing request signal to the provisional-approval terminal management server 300 when the virtual card terminal information is input (S549). The payment processing request information includes virtual card information, card terminal identification information, transaction information, etc.

When the payment processing request signal is received, the provisional-approval terminal management server 300 writes a transaction statement based on the virtual card information (S551) and transmits a direct payment approval request signal including the transaction statement to the card company system 400 (S553).

When the direct payment approval request signal is received, the card company system 400 performs a payment processing according to the transaction statement and transmits a result of the direct payment approval corresponding to the payment processing to the provisional-approval terminal management server 300 and the payment-terminal-specific mobile communication terminal 200.

When the result of the direct payment approval is received, the payment-terminal-specific mobile communication terminal 200 generates a transaction slip (S559) and then transmits the transaction slip to the card-terminal-specific mobile communication terminal 100 (S561).

When the transaction slip is received, the card-terminal-specific mobile communication terminal 100 displays the transaction slip, that is, an electronic receipt (S563). The displayed transaction slip may be managed by being stored or deleted by the user.

It will be understood by those skilled in the art that the present disclosure is not limited to the aforementioned exemplary preferred embodiments, but various improvements, changes, substitutions, or additions can be made therein without departing from the spirit of the present disclosure. The present disclosure is intended to cover the improvements, changes, substitutions, or additions if they fall within the scope of the appended claims.

The invention claimed is:

1. A card payment method through transmission and reception of data between a first mobile communication terminal, which stores information regarding an actual financial card to be used for a payment, and a second mobile communication terminal, which has a payment terminal application (payment terminal app) installed therein for processing a payment based on the actual financial card, the first mobile communication terminal is permitting the second mobile communication terminal to use the actual financial card to make the payment, the card payment method comprising:

receiving, through the payment terminal app executed by the second mobile communication terminal, a first user input including price information;

transmitting, by the second mobile communication terminal, to a server, a request for payment approval, wherein the request includes an application identification information (app ID) associated with the second mobile communication terminal;

checking, by the server, a validity of the second mobile communication terminal by using the received app ID;

when the checking of the validity of the second mobile communication terminal is successful, transmitting, by the server, to the second mobile communication terminal, an approval signal;

setting, based on the approval signal, the second mobile communication terminal to be in a card payment standby state for using the payment terminal app;

receiving, by the first mobile communication terminal, a second user input that is a selection of the actual financial card to be used in a transaction, from a number of actual financial cards stored in the first mobile communication terminal, wherein each of the number of actual financial cards is a respective card having a respective invariable card number that is issued by a respective financial institution and is usable for a plurality of transactions;

transmitting, by the first mobile communication terminal, to a card company system, a request for a virtual financial card number corresponding to the actual financial card, wherein the virtual financial card number is usable for only one transaction;

receiving, by the first mobile communication terminal, from the card company system, the virtual financial card number;

receiving, by the second mobile communication terminal in the card payment standby state, from the first mobile communication terminal, via a near field communication (NFC) connection between the second mobile communication terminal and the first mobile communication terminal, virtual financial card information and identification information of the first mobile communication terminal;

receiving, by the server, from the second mobile communication terminal, the price information, the virtual financial card information and the identification information of the first mobile communication terminal;

writing, by the server, a transaction statement by using the virtual financial card information, the identification information of the first mobile communication terminal, and the price information, and transmitting, by the server, the written transaction statement to the card company system;

receiving, by the second mobile communication terminal, from the card company system, a payment approval result associated with the transaction statement, generating, by the second mobile communication terminal, a transaction slip by using the payment approval result, and transmitting, by the second mobile communication terminal, the transaction slip to the first mobile communication terminal;

displaying, by the first mobile communication terminal, the transaction slip;

receiving, by the server, a payment terminal app use approval request including payment terminal registration information and the app ID of the payment terminal app in response to the second mobile communication terminal detecting an occurrence of a payment terminal registration event; and determining whether to approve the use of the payment terminal app installed in the second mobile communication terminal using the app ID included in the payment terminal app use approval request and performing a process for running the payment terminal app when the approval is determined, by the server.

2. The card payment method of claim 1, wherein the process for running the payment terminal app includes:

requesting and receiving the payment terminal registration information from the second mobile communication terminal;

generating installation authentication code of the payment terminal app in response to the reception of the payment terminal registration information; and transmitting the generated installation authentication code to the second mobile communication terminal, wherein:

the installation authentication code is data that is stored in the payment terminal app by the second mobile communication terminal to enable execution of the payment terminal app; and the payment terminal registration information includes information indicating the second mobile communication terminal and member shop information input by a user of the second mobile communication terminal.

3. The card payment method of claim 2, wherein the process for running the payment terminal app further comprises:

monitoring reception of a signal for running the payment terminal app after the performing of the process for running the payment terminal app;

registering the second mobile communication terminal included in the payment terminal registration information as a card payment terminal of a member shop corresponding to the member shop information included in the payment terminal registration information and generating unique payment terminal identification information when the signal for running the payment terminal app is received;

transmitting the generated unique payment terminal identification information to the second mobile communication terminal, wherein the unique payment terminal identification information is stored in the payment terminal app; and transmitting a payment terminal registration log including the unique payment terminal identification information to the card company system, wherein the payment terminal registration log is registered and stored in the card company system.

4. The card payment method of claim 1, wherein the server registers information of a plurality of second mobile communication terminals by issuing identification information to the plurality of second mobile communication terminals, and stores the identification information of the plurality of second mobile communication terminals.

* * * * *